US011400443B2

(12) United States Patent
Barth et al.

(10) Patent No.: US 11,400,443 B2
(45) Date of Patent: Aug. 2, 2022

(54) ULTRASOUND-ASSISTED METHOD FOR PRODUCING AN SCR CATALYTIC CONVERTER

(71) Applicant: UMICORE AG & CO. KG, Hanau-Wolfgang (DE)

(72) Inventors: Benjamin Barth, Alzenau (DE); Martin Foerster, Büdingen (DE); Morten Schonert, Heusenstamm (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/962,406

(22) PCT Filed: Jan. 16, 2019

(86) PCT No.: PCT/EP2019/051029
§ 371 (c)(1),
(2) Date: Jul. 15, 2020

(87) PCT Pub. No.: WO2019/141719
PCT Pub. Date: Jul. 25, 2019

(65) Prior Publication Data
US 2021/0069691 A1 Mar. 11, 2021

(30) Foreign Application Priority Data
Jan. 16, 2018 (DE) .................. 10 2018 100 834.1

(51) Int. Cl.
| | |
|---|---|
| *B01J 37/34* | (2006.01) |
| *B01J 29/072* | (2006.01) |
| *B01J 35/02* | (2006.01) |
| *B01J 37/00* | (2006.01) |
| *B01J 37/02* | (2006.01) |
| *F01N 3/20* | (2006.01) |
| *B01J 29/06* | (2006.01) |
| *B01J 29/72* | (2006.01) |
| *B01J 29/85* | (2006.01) |
| *B01J 29/74* | (2006.01) |
| *B01J 29/70* | (2006.01) |
| *B01J 29/068* | (2006.01) |
| *B01J 37/30* | (2006.01) |
| *B01J 35/00* | (2006.01) |

(52) U.S. Cl.
CPC ........... *B01J 37/343* (2013.01); *B01J 29/061* (2013.01); *B01J 29/068* (2013.01); *B01J 29/072* (2013.01); *B01J 29/70* (2013.01); *B01J 29/723* (2013.01); *B01J 29/743* (2013.01); *B01J 29/85* (2013.01); *B01J 35/002* (2013.01); *B01J 35/0006* (2013.01); *B01J 35/023* (2013.01); *B01J 37/0009* (2013.01); *B01J 37/0215* (2013.01); *B01J 37/0221* (2013.01); *B01J 37/0236* (2013.01); *B01J 37/0246* (2013.01); *B01J 37/30* (2013.01); *B01J 37/341* (2013.01); *F01N 3/2066* (2013.01); *B01D 2255/20738* (2013.01); *B01D 2255/915* (2013.01); *B01D 2257/102* (2013.01); *B01D 2257/402* (2013.01); *B01D 2257/404* (2013.01); *B01D 2258/012* (2013.01); *B01J 2229/18* (2013.01); *B01J 2229/186* (2013.01); *F01N 2370/04* (2013.01); *F01N 2510/06* (2013.01); *F01N 2510/063* (2013.01); *F01N 2570/14* (2013.01); *F01N 2570/145* (2013.01); *F01N 2610/02* (2013.01)

(58) Field of Classification Search
CPC . Y02A 50/20; B01J 2229/18; B01J 2229/186; B01J 29/061; B01J 29/068; B01J 29/072; B01J 29/70; F01N 3/2066; F01N 2370/04; F01N 2510/06; F01N 2510/063; F01N 2570/14; F01N 2570/145; F01N 2610/02; B01D 53/9418; B01D 2251/206; B01D 2255/20761; B01D 2255/20738; B01D 2255/50; B01D 2255/915; B01D 2255/9155; B01D 2258/012
USPC ............... 502/60, 64, 66, 74; 422/177, 180; 423/235, 239.1, 239.2
See application file for complete search history.

(56) References Cited

U.S. PATENT DOCUMENTS

| | | | |
|---|---|---|---|
| 4,609,563 | A | 9/1986 | Shimrock et al. |
| 6,478,874 | B1 | 11/2002 | Rosynsky et al. |
| 6,548,105 | B2 | 4/2003 | Kiessling et al. |
| 6,599,570 | B1 | 7/2003 | Aderhold et al. |
| 7,143,578 | B2 | 12/2006 | Kakwani et al. |
| 8,640,440 | B2 | 2/2014 | Klingmann et al. |
| 8,794,178 | B2 | 8/2014 | Mergner et al. |
| 10,258,972 | B2 | 4/2019 | Patchett et al. |

(Continued)

FOREIGN PATENT DOCUMENTS

| | | |
|---|---|---|
| CN | 107442163 A | 12/2017 |
| DE | 101 14 328 A1 | 10/2002 |

(Continued)

OTHER PUBLICATIONS

Translation of the Written Opinion for International Patent Application No. PCT/EP2019/051029 dated May 10, 2019 (9 Pages).

(Continued)

*Primary Examiner* — Elizabeth D Wood
(74) *Attorney, Agent, or Firm* — Smith, Gambrell & Russell, LLP (57) ABSTRACT

The present invention relates to a method for producing automobile exhaust gas catalytic converters, to the catalytic converters as such and to the use thereof. In particular, the method comprises a step which results in a smaller particle size of the catalytically active material used.

20 Claims, 2 Drawing Sheets

(56) References Cited

U.S. PATENT DOCUMENTS

| | | | |
|---|---|---|---|
| 2004/0098979 A1 | 5/2004 | Hammerle et al. | |
| 2009/0214397 A1 | 8/2009 | Shirono et al. | |
| 2009/0318283 A1* | 12/2009 | Keshavan | B01J 37/04 502/79 |
| 2010/0143227 A1 | 6/2010 | Keshavan et al. | |
| 2010/0150801 A1 | 6/2010 | Keshavan et al. | |
| 2012/0129684 A1* | 5/2012 | Vimont | B01D 53/9413 502/170 |
| 2015/0224491 A1 | 8/2015 | Lee et al. | |
| 2016/0129430 A1* | 5/2016 | Kato | B01J 29/7415 423/213.5 |

FOREIGN PATENT DOCUMENTS

| | | |
|---|---|---|
| DE | 10 2010 007 499 A1 | 8/2011 |
| EP | 0 311 758 A1 | 4/1989 |
| EP | 1 054 722 | 12/2001 |
| EP | 1 064 094 B1 | 9/2002 |
| EP | 1 136 462 B1 | 8/2004 |
| EP | 1 309 775 B1 | 6/2008 |
| EP | 1 663 458 B1 | 1/2009 |
| EP | 2 042 225 A1 | 4/2009 |
| EP | 2 343 121 A1 | 7/2011 |
| EP | 2 343 122 A1 | 7/2011 |
| EP | 2 3 82 031 B1 | 11/2011 |
| EP | 2 415 522 A1 | 2/2012 |
| EP | 2 521 618 B1 | 8/2013 |
| JP | 5378659 B2 | 12/2013 |
| JP | 2014-205108 A | 10/2014 |
| WO | 99/47260 A1 | 9/1999 |
| WO | 2005/016497 A1 | 2/2005 |
| WO | 2006/021338 A1 | 3/2006 |
| WO | 2006/119550 A1 | 11/2006 |
| WO | 2008/085280 A2 | 7/2008 |
| WO | 2008/106519 A1 | 9/2008 |
| WO | 2008/118434 A1 | 10/2008 |
| WO | 2008/132452 A2 | 11/2008 |
| WO | 2009/156134 A1 | 12/2009 |
| WO | 2912/075400 A1 | 6/2012 |
| WO | 2013/060341 A1 | 5/2013 |
| WO | 2015/121910 A1 | 2/2015 |
| WO | 2015/049110 A1 | 4/2015 |
| WO | 2016/057285 A1 | 4/2016 |
| WO | 2017/080722 A1 | 5/2017 |
| WO | 2017/153239 A1 | 9/2017 |
| WO | 2010/015573 A2 | 2/2020 |

OTHER PUBLICATIONS

International Preliminary Report on Patentability for International Patent Application No. PCT/EP2019/051029 dated Jul. 21, 2020 (10 Pages in German with English translation).

Wikipedia, Luftfeuchtigkeit [Humidity] http://de.wikipedia.org/wiki/Luftfeuchtigkeit, accessed Apr. 15, 2021, (26 pages in German with machine translation).

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).

DIN 66134. Feb. 1998, Bestimmung derPorengröβnverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).

ISO 13320: 2009(E). Particle size analysis—Laser diffraction Methods (60 pages).

DIN 53019-1:2008-09—Viskosimetrie -Messung von Viskositäten und Fließkurven mitRotationsviskosimetern-Teil 1: Grundlagen und Messgeometrie [Viscometry—Measurement of viscosities and flow curves by means of rotational viscometers—Part 1: Principles and measuring geometry] (22 pages in German with machine translation).

"Ultraschall" ["Ultrasonic"], Oct. 2014, pp. 1-6, Retrieved from: https://roempp.thieme.de/roempp4.0/do/data/RD-21-00223 [accessed on Mar. 26, 2019] (6 pages in German with machine translation).

International Search Report for PCT/EP2019/051029, dated May 10, 2019 (7 pgs. with English translation).

Written Opinion of the International Searching Authority for PCT/EP2019/051029, dated May 10, 2019 (9 pgs.).

R. Heck, et al. Catalytic Air Pollution Control, Commercial Technology, 1995, S. 90.

G. Tari, et al. Influence of Particle Size Distribution on Colloidal Processing of Alumina, Journal of the European Ceramic Society 18 (1998) pp. 249-253.

Database of Zeolite Structures, Zeolite Framework Types, http://europe.iza-structure.org/IZA-SC/ftc_table.php.

Horiba, Understanding and Interpreteing Particel Size Distribution Calculations, http://www.horiba.com/scientific/products/particle-characterization/education/general-information/data-interpretation/understanding-particle-size-distrubution-calculations/.

Mayer, T. Feststoff-SCR-System auf Basis von Ammoniumcarbamat [Solid SCR system based on ammonium carbamate], dissertation, Technical University of Kaiserslautern, 2005 (154 Pages in German with English language abstract).

* cited by examiner

ULTRASOUND-ASSISTED METHOD FOR PRODUCING AN SCR CATALYTIC CONVERTER

The present invention relates to a method for producing automobile exhaust gas catalytic converters, to the catalytic converters as such, and to the use thereof. In particular, during production, a work step is used which results in a smaller particle size of the catalytically active material used.

The exhaust gas of combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of soot residues and possibly adherent organic agglomerates. These are referred to as primary emissions. CO, HC, and particulates are the products of the incomplete combustion of the fuel inside the combustion chamber of the engine. Nitrogen oxides form in the cylinder from nitrogen and oxygen in the intake air when combustion temperatures locally exceed 1400° C. Sulfur oxides result from the combustion of organic sulfur compounds, small amounts of which are always present in non-synthetic fuels. In order to remove these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body or monolith with a catalytically active coating applied thereto. The catalyst facilitates the chemical reaction of different exhaust gas components, while forming non-hazardous products, such as carbon dioxide and water.

The flow-through or wall-flow monoliths just described are accordingly also referred to as catalyst supports, supports, or substrate monoliths as they carry the catalytically active coating on their surface or in the walls forming this surface. The catalytically active coating is often applied to the catalyst support in the form of a suspension in a so-called coating process. Many such processes in this respect were published by automobile exhaust gas catalytic converter manufacturers in the past (EP1064094B1, EP2521618B1, WO10015573A2, EP1136462B1, U.S. Pat. Nos. 6,478,874, 4,609,563, WO9947260A1, JP5378659B2, EP2415522A1, JP2014205108A2).

U.S. Pat. No. 6,478,874 states that a vacuum is used to draw a washcoat suspension upwardly through the channels of a substrate monolith. U.S. Pat. No. 4,609,563 also describes a process in which a metered charging system is used for the catalytic coating of a substrate. This system comprises a process of coating a ceramic monolithic support with a precisely controlled, predetermined amount of the washcoat suspension using a vacuum (hereinafter "metered charge"). The monolithic support is immersed in a quantitatively determined amount of washcoat suspension. The washcoat suspension is then drawn by the vacuum into the substrate monolith. In this case, however, it is difficult to coat the monolithic support in such a way that the coating profiles of the channels in the monolithic support are uniform.

In contrast, a process is also established in which a specific amount of washcoat suspension (metered charge) is applied to the top side of an upright substrate monolith, this amount being such that it is practically completely retained within the monolith provided (U.S. Pat. No. 6,599,570). By means of a vacuum/pressure device acting on one of the ends of the monolith, the washcoat suspension is sucked/pressed entirely into the monolith without excess suspension escaping at the lower end of the monolith (WO9947260A1). See in this context also JP5378659B2, EP2415522A1, and JP2014205108A2 of the Cataler company.

In addition to carbon monoxide CO, hydrocarbons HC, and nitrogen oxides $NO_x$, the raw exhaust gas of in particular diesel engines or lean burning spark ignition engines has a relatively high oxygen content of up to 15% by volume. Additionally, particulate emissions are included which predominantly consist of soot residues and in some cases organic agglomerates and result from a partially incomplete combustion of fuel in the cylinder.

Compliance with future statutory exhaust gas limit values for lean burning car engines in effect in Europe, North America, and Japan requires the simultaneous removal of particulates and nitrogen oxides from the exhaust gas in addition to the removal of hydrocarbons and carbon monoxide. The harmful gases carbon monoxide and hydrocarbons from the lean exhaust gas can easily be rendered harmless by oxidation on a suitable oxidation catalyst. Diesel particulate filters with and without additional catalytically active coating are suitable aggregates for removing the particulate emissions. The reduction of nitrogen oxides to nitrogen ("denitrification" of the exhaust gas) is more difficult due to the high oxygen content. A known method is selective catalytic reduction (SCR) of the nitrogen oxides on a suitable catalyst, SCR catalytic converter for short. This method is currently preferred for the denitrification of lean-engine exhaust gases. The nitrogen oxides contained in the exhaust gas are reduced in the SCR process with the aid of a reducing agent metered into the exhaust tract from an external source. Ammonia is used as the reducing agent, which converts the nitrogen oxides present in the exhaust gas into nitrogen and water on the SCR catalytic converter. The ammonia used as reducing agent may be made available by metering an ammonia precursor compound, for example urea, ammonium carbamate, or ammonium formate, into the exhaust tract, and by subsequent hydrolysis.

Compliance with the statutory standards requires current and future applications for the exhaust gas aftertreatment of lean combustion engines to combine diesel oxidation catalysts, diesel particulate filters, and SCR systems, the combination of these aggregates bringing about changed operating conditions, especially for the SCR catalytic converter. At this time, three such systems are in testing: In the so-called "SCRT® system" according to EP1054722B1, a diesel oxidation catalyst, a diesel particulate filter, and an SCR system are arranged consecutively in the flow direction of the exhaust gas. Alternatively, the SCR system can be arranged between a diesel oxidation catalyst close to the engine and a diesel particulate filter in the underfloor of the vehicle (DOC-SCR-DPF) in accordance with US20040098979A1 or in front of a unit comprising a diesel oxidation catalyst and diesel particulate filter (SCR-DOC-DPF) in accordance with WO2009156134A1.

Certain metal-exchanged zeolites or zeotypes can be used as SCR catalytic converters, for example. Zeolites/zeotypes are often subdivided by the ring size of their largest pore openings into large-, medium- and small-pore zeolites/zeotypes. Large-pore zeolites/zeotypes have a maximum ring size of 12, and medium-pore zeolites/zeotypes have a maximum ring size of 10 tetrahedral atoms. Small-pore zeolites/zeotypes (abbreviation: SPZ) have a maximum ring size of 8 tetrahedral atoms (see also: http://europe.iza-structure.org/IZA-SC/ftc_table.php; WO2017080722A1).

While, for example, SCR catalytic converters based on iron-exchanged β-zeolites, i.e., a large-pore zeolite, were and still are widely used in heavy-duty vehicles, SCR catalytic converters based on small-pore zeolites are becoming increasingly important, see for example WO2008/106519A1, WO2008/118434A1, and WO2008/132452A2.

WO2008/132452A2 describes a small-pore zeolite which is exchanged with, for example, copper and can be coated as a washcoat onto a suitable monolithic substrate or extruded to form a substrate. The washcoat may contain a binder selected from the group consisting of aluminum oxide, silica, (non-zeolitic) silica-alumina, natural clays, $TiO_2$, $ZrO_2$, and $SnO_2$.

WO2013/060341A1 describes SCR-active catalyst compositions made of a physical mixture of an acidic zeolite or zeotype in protonic form or in iron-promoted form with, for example, $Cu/Al_2O_3$.

WO12075400A1 describes a catalyst composition consisting of a CHA zeolite containing copper or iron for SCR applications, in which zeolite the average crystal size preferably has a majority of crystal sizes of greater than about 0.5 µm. The zeolites are applied to the supports as an aqueous washcoat suspension. Suggestions for adjusting the grain size, for example by grinding in a ball mill or by means of other milling methods, cannot be taken from the application.

Zeolites or zeotypes, however, are not only used in SCR catalytic converters. They frequently play an important role as hydrocarbon traps at low temperatures (HC trap), especially in diesel oxidation catalysts. They have already been described as nitrogen oxide storage. During the production of catalytic converters which contain metal ion-exchanged zeolites or zeotypes, the procedure is essentially carried out in accordance with the knowledge of the person skilled in the art such that an ion exchange takes place in the zeolite or zeotype in an initial step. In the process, the ions present in the zeolite or zeotype are replaced by those which were found to be catalytically active for the reaction under consideration. This mixture is subsequently applied to the support, generally a flow-through substrate or a wall-flow filter, optionally after prior washing with water, with or without admixing of a binder, using the coating techniques described above. The coating can then be present on the walls of the supports and/or in the pores of the walls forming the channels of the supports. Exemplary production variants of such catalysts can be found in WO2008/106519 A1 or WO2005/016497 A1. In order to homogenize the zeolite suspensions and destroy powder agglomerates, they are usually treated with fast-running agitators or ball mills before or after the ion exchange and before the coating process.

WO08085280A2, for example, describes a catalyst for the selective catalytic reduction of nitrogen oxides with ammonia. In order to produce this catalyst, for example, a washcoat consisting of 10% aluminum oxide, 50% of a zeolite mixture made of H-ZSM-5 and H-beta (1:1), and 40% $Ce0.24Zr0.66La0.04Y0.06O_2$ is ground with water in a ball mill to a mean grain size of 4 to 5 µm.

One disadvantage with the use of ball mills for grinding and dispersing components of the washcoat is the difficulty of scaling up ball mills due to the differing heat exchange behavior as a function of the mill size and geometry.

The use of ultrasound for dispersing and grinding catalytically active material for the production of automobile exhaust gas catalytic converters is mentioned, at best, superficially in the following patent publications: US20100143227A1, US20100150801A1, US20150224491A1, EP2343121A1, EP2343122A1, WO2006119550A1. In particular, treatment of zeolites or zeotypes of the SPZ type is not mentioned herein.

Automobile exhaust gas catalytic converters have to meet ever higher requirements as a result of decreasing statutory limit values for harmful automobile exhaust gases. It is therefore a permanent object of researchers to provide ever more effective and better automobile exhaust gas catalytic converters.

These and other objects which obviously arise for the person skilled in the art from the prior art are achieved by the specification of catalytic converters, the production thereof, and the use thereof according to the claims.

Figure 2:
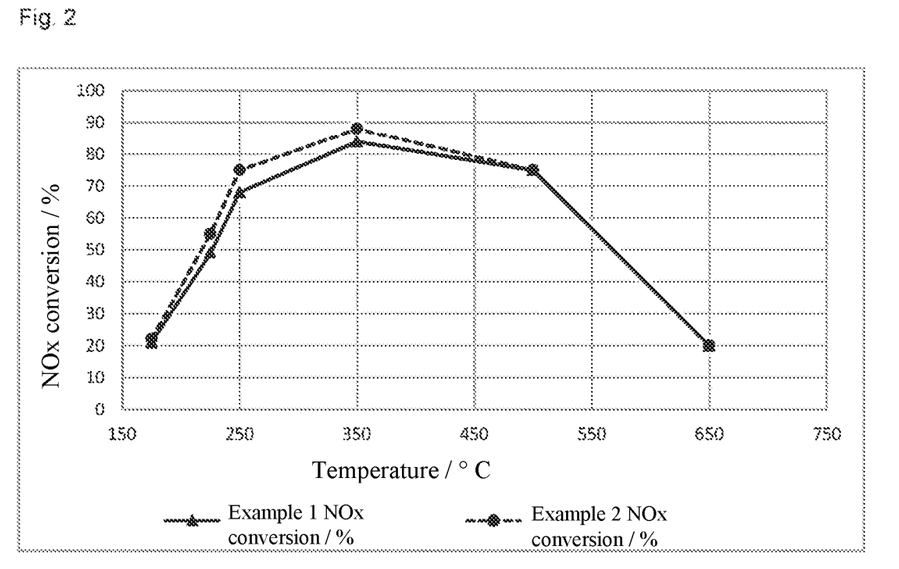
FIG. 2 shows the NOx conversion of Examples 1 to 2 at T=175° C. to 350° C.
Figure 3:
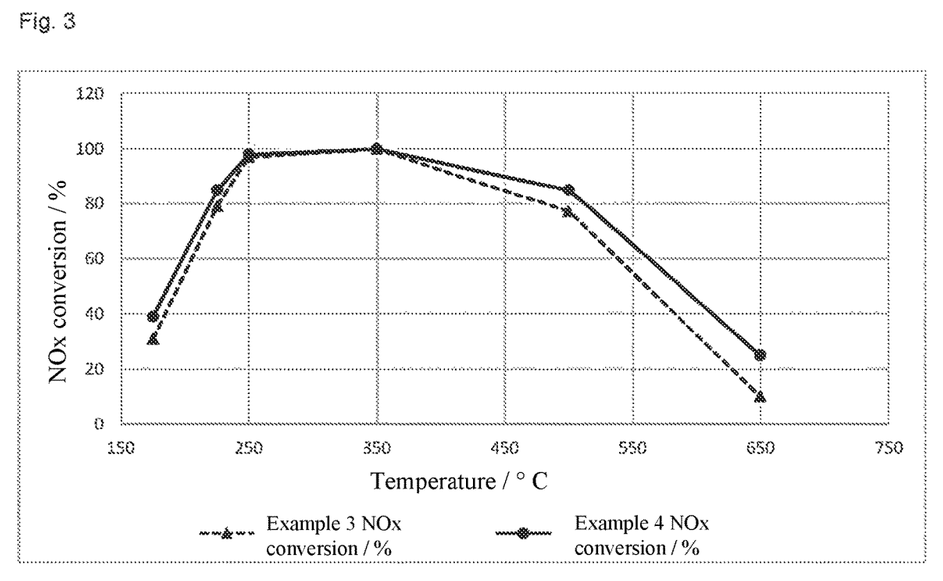
FIG. 3 shows the NOx conversion of Examples 3 to 4 at T=175° C. to 350° C.

The stated object is, surprisingly, achieved by using zeolites or zeotypes, in particular of the SPZ type, in a method for producing a zeolite- or zeotype-containing catalytic converter for the after-treatment of exhaust gases of a car engine, in particular for the SCR reaction, and by treating the zeolites or zeotypes, prior to the coating onto and/or into a support, by means of ultrasound in such a way that their particle size is largely (d50) reduced to less than 20 µm. By treating the zeolites or zeotypes in the coating suspension by means of ultrasound, they are split into smaller compartments. This seems to have a significant influence on the coatability of the supports with the zeolites or zeotypes, and also on the activity of the final coating, which could not readily be expected in this way in the light of the prior art. It is believed that the zeolite compartments are not destroyed by the mild method of "ultrasonic milling" as in normal ball milling but are largely kept intact and thus, surprisingly, are able to ensure better activity (FIG. 2/FIG. 3). In particular, it is surprising that the back pressure is significantly reduced by uniformly coated filters in the method according to the invention (Table 4).

In principle, all types contemplated by the person skilled in the art for the corresponding field of application, or mixtures thereof, can be used as zeolites or zeotypes. These include naturally occurring but preferably synthetically produced small-pore zeolites. These can comprise framework types, for example from the group consisting of beta, ferrierite, Y, USY, ZSM-5, ITQ. Examples of synthetically produced small-pore zeolites possible here are those belonging to the structure types ABW, ACO, AEI, AEN, AFN, AFT, AFX, ANA, APC, APD, ATN, ATT, ATV, AWO, AWW, BIK, BRE, CAS, CDO, CHA, DDR, DFT, EAB, EDI, EPI, ERI, ESV, GIS, GOO, IHW, ITE, ITW, JBW, KFI, LEV, LTA, LTJ, MER, MON, MTF, NSI, OWE, PAU, PHI, RHO, RTE, RTH, SAS, SAT, SAV, SIV, THO, TSC, UEI, UFI, VNI, YUG, and ZON. Preferably used are those of the small-pore type which are derived from a structure type from the group consisting of CHA, LEV, AFT, AEI, AFI, AFX, KFI, ERI, DDR. Particularly preferred are those which are derived from structure types selected from the group consisting of CHA, LEV, AEI, AFX, AFI, or KFI framework, or a mixture thereof. A zeolite of the AEI or CHA type is most particularly preferred in this context. Mixtures of the aforementioned species are also possible. The SAR value of the zeolite or the corresponding value of the zeotype (e.g., SAPO→(Al+P)/2Si) should be in the range of 5 to 50, preferably 10 to 45, and particularly preferably 20 to 40.

For a correspondingly good activity, for example in the SCR reaction, it is necessary for the zeolites or zeotypes, and in particular those of the small-pore type, to be present exchanged with metal ions in particular transition metal ions. Here, the person skilled in the art can use the metal ions which can preferably be used for the corresponding reaction. Metal ions from the group of platinum metals, in particular platinum, palladium, and rhodium, for example, have emerged for the oxidation of hydrocarbons, while, for example, the SCR reaction has been shown to be most effective with zeolites or zeotypes exchanged with iron and/or copper ions. The person skilled in the art knows how such an ion exchange can take place (for example WO2008/106519A1). The degree of exchange (number of ions at exchange sites/total number of exchange sites) should be between 0.3 and 0.5. Here, "exchange sites" refers to those at which the positive ions compensate for negative charges of the lattice. Further non-exchanged metal ions, in particular Fe and/or Cu ions, can preferably also be present in the final SCR catalytic converter. The ratio of exchanged to non-exchanged ions is >50:50, preferably 60:40 to 95:5, and most preferably 70:30 to 90:10. The ions located at exchange sites are visible in electron spin resonance analysis and can be quantified (Quantitative EPR, Gareth R. Eaton, Sandra S. Eaton, David P. Barr, Ralph T. Weber, Springer Science & Business Media, 2010). All non-ion-exchanged cations are present in other locations within or outside the zeolite/zeotype. The latter do not compensate for a negative charge of the zeolite/zeotype framework. They are invisible in EPR and can thus be calculated from the difference between the overall metal loading (for example determined by ICP) and the value determined in the EPR. The addition of the corresponding ions to the coating mixture is controlled in such a way that the total amount of metal ions, in particular Fe and/or Cu ions, in the final entire catalyst, is 0.5 to 10% by weight, preferably 1 to 5% by weight of the coating amount.

In addition to the components just discussed, the coating suspension may also contain further constituents. The latter can be added to the suspension before or after the ultrasound treatment according to the invention. In this context, binders selected from the group consisting of aluminum oxide, titanium dioxide, zirconium dioxide, silicon dioxide, or mixtures have proven to be advantageous components. These components may further support the catalytic function of the catalytically active material but do not actively interfere with the reaction. Materials used here are so-called binders. The latter, among other things, ensure that the materials and components involved in the reaction can adhere sufficiently firmly to the corresponding substrate. In the present case, high-surface aluminum oxides are preferably used as such materials. The binder is used in a particular amount in the coating. Based on the solid material used in the coating suspension, the binder is used in an amount of a maximum of 25% by weight, preferably a maximum of 20% by weight, and most particularly preferably in an amount of 5% by weight to 15% by weight.

At a shear rate of 1/s, the viscosity (viscosity: DIN 53019-1:2008-09, latest version valid on the filing date) is advantageously 0.01 to 10 Pa*s, preferably 0.02 to 2 Pa*s and particularly preferably 0.05 to 1.5 Pa*s. The shear rate-dependent viscosity can be measured with a cone and plate rheometer (Malvern, Kinexus type, or Brookfield, RST type). The coating suspension is applied to the supports in accordance with the knowledge of the person skilled in the art (see introductory references in this respect). The term "coating" is accordingly to be understood to mean the application of the frequently aqueous suspension made of catalytically active materials and optionally further constituents (also referred to as washcoat) onto a substantially inert support body, which can be a wall-flow filter or flow-through monolith. The coating layer thus assumes the actual catalytic function. After the application of the suspension, the support is dried as described in the literature mentioned at the outset and, if applicable, calcined at an elevated temperature. The coating may consist of one layer or be made up of multiple identical or different layers that are applied atop one another (multi-layered) and/or offset relative to one another (zoned) onto a support body.

A substrate of the wall-flow type (wall-flow filter) or of the flow-through type can be used here as the support. Flow-through monoliths are conventional catalyst supports in the prior art, which can consist of metal (corrugated carrier, for example WO17153239A1, WO16057285A1, WO15121910A1 and literature cited therein) or ceramic materials. Refractory ceramics, such as cordierite, silicon carbide, or aluminum titanate, etc. are preferably used. The number of channels per area is characterized by the cell density, which typically ranges between 300 and 900 cells per square inch (cpsi). The wall thickness of the channel walls in the case of ceramics is between 0.5 to 0.05 mm.

All ceramic materials customary in the prior art can be used as wall-flow monoliths or wall-flow filters. Preferably, porous wall-flow filter substrates made of cordierite, silicon carbide, or aluminum titanate are used. These wall-flow filter substrates have inlet and outlet channels, wherein the respective downstream ends of the inlet channels and the upstream ends of the outlet channels are offset against each other and closed with gas-tight "plugs." In this case, the exhaust gas to be purified, which flows through the filter substrate, is forced to pass through the porous wall between the inlet channel and outlet channel, which delivers an excellent particulate filter effect. The filtration property for particulates can be designed by means of porosity, pore/radii distribution, and thickness of the wall. The catalyst material may be present in form of washcoat suspensions in and/or on the porous walls between the inlet and outlet channels. Wall-flow monoliths that were extruded directly or with the aid of binders from the corresponding catalyst materials, meaning that the porous walls directly consist of the catalyst material, such as can be the case in the case of SCR catalytic converters based on zeolite or vanadium, may also be used. Such extruded SCR monoliths can also be provided, as described above, with a washcoat suspension in and/or on the porous walls. Substrates preferably to be used may be taken from EP1309775 A1, EP2042225 A1, or EP1663458 A1. The porosity of the wall-flow filters is generally more than 40%, generally from 40% to 75%, particularly from 45% to 70% [as measured in accordance with DIN 66133, latest version on the filing date]. The average pore size is at least 7 µm, for example 7 µm to 34 µm, preferably more than 10 µm, in particular 10 µm to 20 µm, or 21 µm to 33 µm [as measured in accordance with DIN 66134, latest version on the filing date]. The finished and coated filters having a pore size of, in general, 10 µm to 33 µm, and a porosity of 50% to 65%, are particularly preferred. A corresponding support of the wall-flow type is most particularly preferably used in the present case.

The ultrasonic treatment of the coating suspension can be effected according to the knowledge of the person skilled in the art. The ultrasonic treatment of the washcoat suspension can take place, for example, in a system as outlined in FIG. 1. The system consists of a storage container (1) in which, depending on the batch size, between 50 and 10001 of the washcoat suspension is located and is stirred with an agitator. Via a pump (2), the aqueous zeolite-containing/zeotype-containing suspension is circulated via a cooling section (4) during the grinding and dispersing process through a reactor LU, which is equipped in the interior with an ultrasonic sonotrode for homogenization and dispersion. The system can be equipped with a pulsation damper (3) and a flow regulator (6) for the homogenization and regulation of the liquid flow. In principle, the deagglomeration, comminution, and/or dispersion of the zeolites or zeotypes with ultrasound can also take place in a stationary batch process without recirculation.

The deagglomeration, comminution, and/or dispersion of the particles by the ultrasound are based on the operating principle of cavitation. High-frequency electrical energy is converted into mechanical oscillations (ultrasound) by means of so-called ultrasound oscillators (for example made of piezo zirconate titanate (PZT)). In this way, minute vacuum bubbles are produced in the liquid and immediately implode again and comminute the powder particles as a result of the pressure surges arising in the process. The comminution effect is dependent on the amplitude of the ultrasound (energy), the frequency, and the sonication duration.

Most particularly preferably, the particle size after the ultrasonic treatment of the coating suspension is below 7 µm (d50), more preferably below 7 µm (d80), and most particularly preferably below 7 µm (d99). These values apply to wall-flow filters. For flow-through monoliths, the particle sizes (d50) are in the range below 20 µm, preferably below 25 µm (d80), and most preferably below 30 µm (d99). The lower limit for the particle size is generally ≥0.01 µm, more preferably ≥0.05 µm, and particularly preferably ≥0.1 µm. In order to produce these particles, an ultrasonic source acts on the coating suspension in such a way that the ultrasound preferably has an amplitude of 5 to 100 µm, more preferably 10 to 35 µm, and most preferably 15 to 25 µm. The frequency of the ultrasound used is advantageously 5 to 30 kHz, more preferably 10 to 25 kHz, and most preferably 15 to 20 kHz. The power irradiated thereby should preferably be 500 to 50000 watts, more preferably 1000 to 30000 watts, and most particularly preferably 2000 to 20000 watts.

The particle size is usually determined as the average grain size of the particles in the aqueous washcoat suspension by way of laser diffraction methods. In the values of the grain size indicated in the examples, the particle size is measured by way of the laser diffraction method in an aqueous suspension of the zeolites according to ISO 13320-1 (latest version valid on the filing date). ISO 13320-1 Particle Size Analysis—Laser Diffraction Methods describes the method widely used in the art for determining the grain size distribution of particles in the nanometer and micrometer range by way of laser diffraction. In the case of laser diffraction, particie size distributions are determined by measuring the angular dependence of the intensity of scattered light of a laser beam penetrating a dispersed particle sample. The essential variables for characterizing the grain size distribution of the partioles are d10, d50, and d90 or d99 values based on the number of particles in the sample. The d50 value, or central or median value, indicates the mean value of the particle size and means that 50% of all particles are smaller than the stated value. For the d10 value, 10% of all particles are smaller than this value, and 90% are greater. The same applies (http://www.horiba.com/scientific/products/particle-characterization/education/general-information/data-interretation/understandino-particle-size-distribution-calculations/) to the d90/d99 value.

The present invention likewise relates to a catalytic converter produced according to the invention for the aftertreatment of exhaust gases of a car engine, in particular a corresponding SCR catalytic converter. Most particularly preferably, the support is a wall-flow filter. It has a loading with the dry coating suspension of 30 to 200 g/l, preferably 50 to 160 g/l, and most particularly preferably 80 to 145 g/l. This applies most particularly advantageously to the coating of the wall-flow filter with an SCR catalytic converter.

The present invention also relates to the use of a catalytic converter according to the invention for the aftertreatment of exhaust gases of a car engine. As such, in principle, all exhaust gas aftertreatments which are contemplated by the person skilled in the art for this purpose can be used. Zeolites and zeotypes as mentioned at the outset are present, inter alia, in TWCs (three-way catalysts), DOCs (diesel oxidation catalysts), PNAs (passive NOx absorbers) LNTs (nitrogen oxide storage catalysts), and in particular in SCR catalytic converters. The catalytic converters prepared by the method according to the invention are suitable for all these applications. The use of these catalytic converters for the treatment of exhaust gases of a lean burning car engine is preferred. It is most particularly preferred if the accordingly produced catalytic converters are used in the selective reduction of nitrogen oxides by means of ammonia (SCR treatment).

For the SCR treatment of the preferably lean exhaust gas, ammonia or an ammonia precursor compound is injected therein, and both are conducted across an SCR catalytic converter according to the invention. The temperature above the SCR catalytic converter should be between 150° C. and 500° C., preferably between 200° C. and 400° C. or between 180° C. and 380° C. so that the reduction can take place as completely as possible. A temperature range of 225° C. to 350° C. for the reduction is particularly preferred. Furthermore, optimum nitrogen oxide conversions are only achieved if there is a molar ratio of nitrogen monoxide to nitrogen dioxide (NO/NO2=1) or the ratio NO2/NOx=0.5 (G. Tuenter et al., Ind. Eng. Chem. Prod. Res. Dev. 1986, 25, 633-636; ???). Optimal conversions beginning with 75% conversion already at 250° C. with simultaneously optimal selectivity to nitrogen, according to the stoichiometry of the reaction equation $$2NH_3+NO+NO_2 \rightarrow 2N_2+3H_2O$$

are only achieved with an $NO_2/NOx$ ratio of around 0.5. This applies not only to SCR catalytic converters based on metal-exchanged zeolites but to all common, i.e., commercially available, SCR catalytic converters (fast SCR).

The injectors used can be selected at will by the person skilled in the art. Suitable systems can be found in the literature (T. Mayer, Feststoff-SCR-System auf Basis von Ammoniumcarbamat (Solid SCR system based on ammonium carbamate), dissertation, Technical University of Kaiserslautern, 2005). The ammonia can be introduced into the exhaust gas stream via the injector as such or in the form of a compound which causes ammonia to be formed under the ambient conditions. Examples of possible compounds include, among other things, aqueous solutions of urea or ammonium formate, as well as solid ammonium carbamate. They can be taken from a provided source known per se to the person skilled in the art and can be added to the exhaust gas stream in a suitable manner. The person skilled in the art particularly preferably uses injection nozzles (EP0311758 A1). By means of these injection nozzles, the optimal ratio of $NH_3/NOx$ is set so that the nitrogen oxides can be converted to $N_2$ as completely as possible.

It has been found to be particularly advantageous for the production of the catalytic converters according to the invention if the method according to the invention is combined with a process step in which the coating suspension is supplied to a pre-drying step after the coating of the support. Further improved catalytic converters are obtained at least when the zeolite or zeotype used is a metal ion-exchanged zeolite or zeotype, in particular a SPZ, and is dried, after it has been coated onto and/or into a support, in such a way that a gas stream is conducted through the support for a sufficient period of time and with sufficient intensity so that the solids content in the applied washcoat layer is adjusted to 45% to 60% before the support is completely dried and/or calcined.

Accordingly, a gas stream, preferably an air stream, is conducted through the supports after the support has been coated with the coating suspension. This gas stream is intended to correspondingly lower the water content of the support together with the coating, which is likely to cause the mobility of the components in the coating to decrease. By reducing the moisture content of the coating, a pseudo-plastic state is possibly achieved, which helps to prevent an unfavorable distribution of the coating components. The solids content is adjusted on the support in such a way that, after it has been coated onto and/or into a support, a gas stream is conducted through it for a sufficient period of time and with a sufficient intensity so that the solids content in the applied washcoat layer is adjusted to 45% to 60%, more preferably 50% to 60%, before the support is completely dried and/or calcined.

In order to reduce the moisture content of the coated support, the gas/air stream is conducted through the support for a certain period of time until the wet weight of the applied washcoat layer has been accordingly reduced. The gas stream may have a temperature of not more than 60° C., preferably not more than 45° C. A lower limit for the gas stream is certainly determined by the reduced ability of cold gas streams to absorb moisture. This lower limit is 10° C., preferably 15° C., and particularly preferably 20° C.

The gas stream is conducted through the support. It can have a velocity in the process. A velocity of the gas stream through the support between 5 to 60 m/s, preferably 10 to 40 m/s is possible, and 20 to 30 m/s is preferred. The gas stream is generated by applying a pressure difference of at least 20 mbar between the inlet and outlet sides of the support. It must be taken into account here that larger pressure differences of 50 to 600 mbar, preferably 100 to 500 mbar, and particularly preferably 150 to 400 mbar are useful for the application of wall-flow filters. In the case of flow-through supports, pressure differences of 20 to 400 mbar, preferably 50 to 350 mbar, and particularly preferably 80 to 300 mbar are suitable. An embodiment in which the gas stream is sucked through the support counter to the direction of coating is preferred. This is preferably done by applying a negative pressure to one end of the support. This seems to be particularly preferred with respect to the use of a wall-flow type support since the coating is thus sucked and distributed into the pores of the wall-flow filter as the gas is being conducted.

In the described pre-drying step, a gas stream/air stream is accordingly conducted for a sufficient period of time in order to preferably adjust the solids content. This period of time should preferably be as short as possible. On the other hand, the period of time should be selected in such a way that the corresponding solids content can be reliably obtained for all supports. In general, the period of time will be between 10 seconds and 2 minutes, preferably between 15 seconds and 1 minute, and most preferably, the gas stream lasts for a period of time of 15 to 40 seconds, most preferably >20 to <40 seconds.

In the method described, it is advantageous when the relative humidity of the gas that flows through the support during the method step according to the invention is specially adapted. All gases which the person skilled in the art contemplates for drying and are selected from the group consisting of air, $CO_2$, $N_2$, noble gases, or mixtures thereof can be used as the gas. Optionally, reactive gases, such as $H_2$ or $O_2$, can be admixed. Preferably, air is used. It has proven to be favorable, in particular with regard to the use of air, to use relatively dry gas for pre-drying. The relative humidity of the gas, in particular air (http://de.wikipedia.org/wiki/Luftfeuchtigkeit), should be reduced to values of less than 5 g of water per kilogram of gas/air. The use of less than 4 g of water per kilogram of gas/air is preferred, and less than 3 g of water per kilogram of gas/air is particularly preferred.

As a result of the additional treatment of the supports coated with zeolites or zeotypes by means of a pre-drying step, the activity of the final catalysts can surprisingly be further increased, which could not be expected beforehand. In addition, the actual drying time can be drastically reduced, which leads to the use of the additional pre-drying step ultimately resulting in a net shortening of the overall processing time. The support used is preferably again one of the wall-flow type.

The present invention therefore also relates to the catalytic converters resulting from the combined processes (ultrasonic treatment and pre-drying) and to the use thereof in exhaust gas after-treatment, in particular in the SCR treatment of automobile exhaust gases of lean burning engines. The preferred embodiments of the method, of the catalytic converter, and of the use thereof described above for the ultrasonic treatment also apply mutatis mutandis to the subject matters considered here and aimed at the additional pre-drying.

In the present document, lean combustion is frequently mentioned. The combustion air ratio (A/F ratio; air/fuel ratio) sets the air mass $m_{L,actual}$ which is actually available for combustion in relation to the minimum required stoichiometric air mass $m_{L,st}$, which is required for complete combustion:

$$\lambda = \frac{m_{L,actual}}{m_{L,st}}$$

If $\lambda=1$, the ratio is considered a stoichiometric air/fuel ratio where mL,actual=mL,st; this is the case if all fuel molecules can theoretically react fully with the atmospheric oxygen, without a lack of oxygen or without unburned oxygen being left over.

The following applies to combustion engines:

$\lambda<1$ (for example, 0.9) means "air deficiency": rich exhaust gas mixture $\lambda>1$ (for example, 1.1) means "excess air": lean exhaust gas mixture Statement: $\lambda=1.1$ means that 10% more air is present than would be necessary for the stoichiometric reaction. This is also referred to as excess air. However, an air/fuel mixture which corresponds to a lambda value of 0.8 to 1 is preferably maintained during the regeneration. This value is particularly preferably between 0.85 and 0.99, and most particularly preferably between 0.95 and 0.99.

To the extent that mention is made of lean burning car engines or lean combustion engines in the present text, reference is made primarily to diesel engines and predominantly on average lean burning spark ignition engines. The latter are gasoline engines operated predominantly on average with a lean A/F ratio (air/fuel ratio). The expression "predominantly on average" takes into consideration the fact that modern stoichiometrically operated gasoline engines, for example, are not statically operated at a fixed air/fuel ratio (A/F ratio; $\lambda$ value). For example, three-way catalysts containing oxygen storage material are used in the exhaust tract for spark ignition engines burning "predominantly on average stoichiometrically." These catalytic converters are subjected by the spark ignition engines to exhaust gas with a discontinuous course of the air ratio $\lambda$. They undergo a periodic change of the air ratio $\lambda$ in a defined manner and thus a periodic change in oxidizing and reducing exhaust gas conditions. This change in the air ratio $\lambda$ is in both cases significant for the exhaust gas purification result. To this end, the $\lambda$ value of the exhaust gas is regulated with a very short cycle time (ca. 0.5 to 5 Hertz) and an amplitude $\Delta\lambda$ of $0.005 \leq \Delta\lambda \leq 0.07$ at the value $\lambda=1$ (reducing and oxidizing exhaust gas constituents are present in a stoichiometric relationship to each other).

Therefore, on average, the exhaust gas under such operating conditions should be described as "on average" stoichiometric. In order to prevent these deviations from having a negative effect on the exhaust gas purification result when the exhaust gas is conducted across the three-way catalyst, the oxygen storage materials contained in the catalytic converter balance out these deviations to a certain degree by absorbing oxygen from the exhaust gas or releasing it into the exhaust gas as needed (Catalytic Air Pollution Control, Commercial Technology, R. Heck et al., 1995, p. 90). However, due to the dynamic manner of operation of the engine in the vehicle, further deviations from this condition also occur intermittently. For example, under extreme acceleration or during deceleration while coasting, operating conditions of the engine, and thus of the exhaust gas, can be set which, on average, may be hyperstoichiometric or hypostoichiometric. However, predominantly, i.e., during the majority of time of the combustion operation, the stoichiometrically burning spark ignition engine has an, on average, stoichiometric combustion. This applies mutatis mutandis with respect to lean burning engines. These include, for example, a lean burning spark ignition engine and thus exhaust gas that predominantly, i.e., during the majority of time of the combustion operation, has an, on average, i.e., on average over time, lean air/fuel ratio.

Zeolites and zeotypes are defined in WO2015049110 A1. This invention is also based on this definition.

Without being bound by any particular theory, it is assumed that conventional milling processes, such as with a ball mill, lead, as a result of abrasion and destruction of the crystallites, to an increase in the fine fraction in the washcoat suspension and thus, in general, to an increase in viscosity. Analyses by G. Tari et al. (Journal of the European Ceramic Society 18 (1998) 249-253) show the influence of the grain size of aluminum oxide particles on the viscosity of suspensions produced therefrom. It has been found that the smaller the mean particle size of the suspended aluminum oxide, the higher the viscosity values of suspensions having identical solids contents. This general increase in viscosity, which is also observed in the case of other solids, has a negative influence on the coatability in the usual coating processes of ceramic supports, for example by sucking the washcoat suspension from above into the ceramic support, or pressing it in or pumping it in from below.

Surprisingly, it has been found that an improved catalytic converter is produced with the present method on the one hand and, when used in wall-flow filters, the exhaust gas back pressure can be reduced on the other hand. Both lead to superior catalytic converters according to the invention. In the light of the prior art, this was not to be expected.

Figure 1:
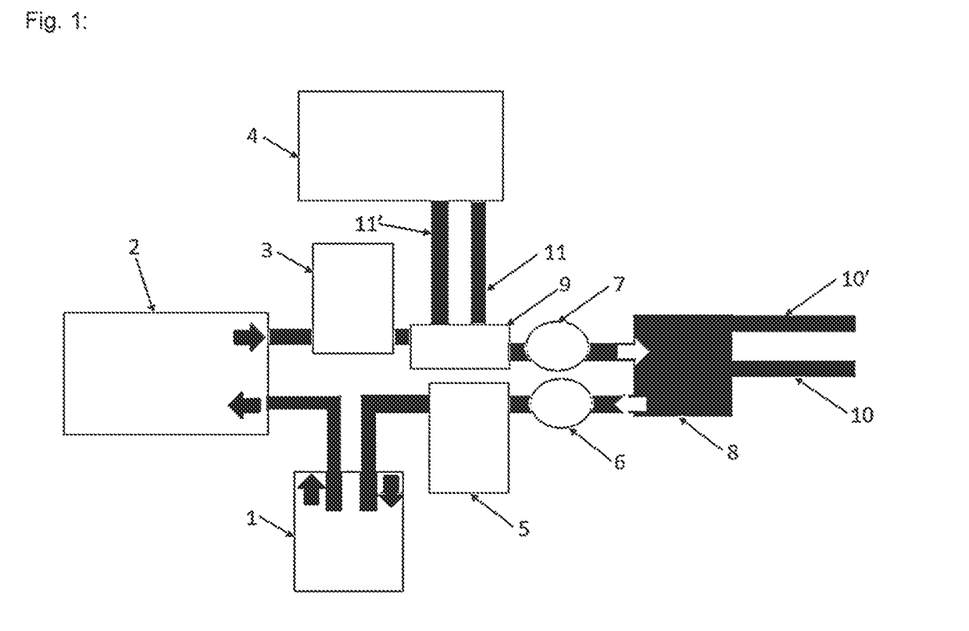
FIG. 1 shows a system for the ultrasonic treatment of a washcoat suspension.

FIG. 1:
1. Storage container
2. Peristaltic pump
3. Pulsation damper
4. Cooling unit
5. Pinch valve
6. Temperature control unit
7. Pressure control unit
8. Ultrasonic reactor
9. Cooling section
10, 10' Cooling line
11, 11'. Cooling line

EXAMPLES

A ceramic filter consisting of a support body made of silicon carbide (NGK) with a porosity of 63% at an average pore size of 20 μm in the dimensions stated in Table 1 was used for the present tests for Examples 1 and 2:

TABLE 1

| Data of the filter support | |
| --- | --- |
| Diameter | 165 mm |
| Length | 140 mm |
| Cell density | 300 cpsi |
| Wall thickness | 0.305 mm |

A ceramic flow-through substrate consisting of a support body made of cordierite (NGK) in the dimensions stated in Table 2 was used for the present tests for Examples 3 and 4:

TABLE 2

| Data of the monolithic substrate | |
| --- | --- |
| Diameter | 144 mm |
| Length | 76 mm |
| Cell density | 400 cpsi |
| Wall thickness | 0.165 mm |

These are coated in a coating system according to the process described in WO2006021338A1. The following steps are carried out for this purpose:

a) vertically aligning the flow channels of the support so that one end face is at the bottom and the second end face is at the top;

b) introducing the coating composition into the support through the flow channels of the support which are open in the lower end face, up to a desired height above the lower end face;

c) removing excess coating composition toward the bottom.

During coating, the washcoat is at room temperature, which is usually 20° C. to 40° C., and consists of a suspension of a copper-exchanged zeolite (chabasite) with a solids content of 37%. The suspension is ground in Example 1 and Example 3 by means of a stirred ball mill (for example. Netsch or Hosokawa-Alpine) using zirconium oxide grinding balls having a diameter of 1 mm. After coating, the loading of the support with washcoat is determined by weighing the support. In Examples 2 and 4, the suspension is dispersed to the target particle size by way of an ultrasonic dispersion unit UiP2000 from Hielscher Ultrasonics. In all examples, the d50 value was within the scope of the claims.

EXAMPLES

1. Example: Zeolite-containing washcoat milled with a ball mill with d99=6.8 µm, dried standing in a convection oven at 120° C. for 30 minutes after coating onto filter substrate, tempered at 350° C. for 30 minutes, subsequently calcined at 550° C. for 2 h (standard process, not according to the invention).

2. Example: Zeolite-containing washcoat dispersed by means of ultrasound with d99<6.7 µm (Hielscher UiP 2000, 2 kW, 3 bar, 100% amplitude) according to the method according to the invention, dried standing in a convection oven at 120° C. for 30 minutes after coating onto filter substrate, tempered at 350° C. for 30 minutes, subsequently calcined at 550° C. for 2 hours.

3. Example: Zeolite-containing washcoat milled with a ball mill with d99=25.0 µm, dried standing in a convection oven at 120° C. for 30 minutes after coating onto flow-through monolith, tempered at 350° C. for 30 minutes, subsequently calcined at 550° C. for 2 h (standard process, not according to the invention).

4. Example: Zeolite-containing washcoat dispersed by means of ultrasound with d99=25.5 µm (Hielscher UiP 2000, 2 kW, 3 bar, 100% amplitude) according to the method according to the invention, dried standing in a convection oven at 120° C. for 30 minutes after coating onto flow-through monolith, tempered at 350° C. for 30 minutes, subsequently calcined at 550° C. for 2 hours.

In order to determine the catalytic effectiveness of the coated supports, they are aged for 16 hours under hydrothermal conditions (10% water) at 800° C. after calcination and subsequently tested with respect to their activity in the selective catalytic reduction of NOx on a model gas test stand. In the present case, this takes place in a dynamic test based on an ammonia breakthrough criterion under the gas conditions shown in Table 3.

TABLE 3

Gas composition of the testing of catalytic activity on a model gas test stand at T = 175° C., 225° C., 250° C., and 350° C.

| Gas | Proportion |
| --- | --- |
| NOx | 500 ppm |
| NO2 | 0 ppm |
| NH3 | 750 ppm |
| O2 | 10% by volume |
| CO | 350 ppm |
| C3H6 | 100 ppm |
| H2O | 5% by volume |
| N2 | Remainder |

Table 4 shows the results of the measurements of the exhaust gas back pressures and NOx conversion rates of the differently manufactured wall-flow filters.

TABLE 4

Data for characterization of the filters from Examples 1 and 2

| Example | Loading (g/L) | Pressure increase at 600 m³/h (%) | X (NOx) at 250° C. after aging (%) |
| --- | --- | --- | --- |
| 1 | 120 | 49% | 68% |
| 2 | 120 | 32% | 75% |

FIG. 2: NOx conversion of Examples 1 to 2 at T=175° C. to 350° C. on the model gas under the gas composition indicated in Table 4.

Table 5 shows the results of the measurements of the NOx conversion rates of the differently produced flow-through monoliths.

TABLE 5

Data for characterization of the flow-through monoliths from Examples 3 and 4

| Example | Loading (g/L) | X (NOx) at 250° C. after aging (%) | X (NOx) at 650° C. after aging (%) |
| --- | --- | --- | --- |
| 3 | 200 | 68% | 10% |
| 4 | 200 | 75% | 25% |

FIG. 3: NOx conversion of Examples 3 to 4 at T=175° C. to 350° C. on the model gas under the gas composition indicated in Table 5.

The invention claimed is:

1. A method for producing a catalytic device containing a zeolite or zeotype for the aftertreatment of exhaust gases of a car engine, comprising: supplying onto and/or into a support a coating having the zeolite or zeotype, with the zeolite or zeotype having been treated with ultrasound in such a way that the particle size of the zeolite or zeotype is reduced to less than 20 µm (d50).

2. The method according to claim 1, wherein the zeolite or zeotype is derived from structure types selected from the group consisting of the CHA, LEV, AEI, AFX, AFI, or KFI framework, or a mixture thereof.

3. The method according to claim 1, wherein the zeolite or zeotype is exchanged with iron and/or copper ions.

4. The method according to claim 1, wherein the coating comprises a binder selected from the group consisting of aluminum oxide, titanium dioxide, zirconium dioxide, silicon dioxide, or mixtures thereof.

5. The method according to claim 1, wherein the support is a wall-flow filter.

6. The method according to claim 1, wherein the particle size (d99) is below 7 µm.

7. The method according to claim 1, wherein the supplied coating has zeolite or zeotype that has been subjected to an ultrasound with an amplitude of 5 to 100 µm.

8. The method according to claim 1, wherein the supplied coating has zeolite or zeotype that has been subjected to an ultrasound with a power of 500 to 50000 watts.

9. The method according to claim 1, wherein the coating is subjected to a pre-drying step after the coating of the support.

10. A catalytic device for the aftertreatment of exhaust gases of a car engine, produced according to claim 1.

11. The catalytic device according to claim 10, wherein the support is a wall-flow filter.

12. The catalytic device according to claim 11, wherein the support has a loading with the coating of 30 to 200 g/l.

13. A method for the after-treatment of exhaust gases of a car engine comprising placing the exhaust gases in contact with the catalytic device according to claim 10.

14. The method according to claim 13, wherein the exhaust gases are exhaust gases of a lean burning car engine.

15. The method according to claim 13, wherein the catalytic device is a catalytic device for the selective reduction of nitrogen oxides by ammonia.

16. A method for producing a catalytic device containing a zeolite or zeotype for the aftertreatment of exhaust gases of a car engine, comprising:
   treating the zeolite or zeotype with a sonotrode in such a way that the particle size thereof is reduced to less than 20 μm (d50); and
   providing a coating that contains the sonotrode treated zeolite or zeotype onto and/or into a support.

17. A method for producing a catalytic device containing a zeolite or zeotype for the aftertreatment of exhaust gases of a car engine, comprising:
   treating the zeolite or zeotype with ultrasound in such a way that the particle size thereof is reduced to less than 20 μm (d50); and
   providing a coating that contains the ultrasound treated zeolite or zeotype onto and/or into a support.

18. A catalytic device for the aftertreatment of exhaust gases of a car engine, produced according to claim 17.

19. The catalytic device according to claim 18 wherein the zeolite or zeotype is a small-pore zeolite with ion exchanged iron and/or copper.

20. A method for the after-treatment of exhaust gases of a car engine comprising placing the exhaust gases in contact with the catalytic device according to claim 18 as to cause an SCR reaction.

* * * * *